(No Model.)

M. J. KUGLER.
BENCH DOG.

No. 313,943.  Patented Mar. 17, 1885.

WITNESSES
Wm. N. Mortimer
E. G. Siggers

INVENTOR
M. J. Kugler
By his Attorneys
C. A. Snow & Co.

UNITED STATES PATENT OFFICE.

MARTIN J. KUGLER, OF BARNESVILLE, OHIO.

BENCH-DOG.

SPECIFICATION forming part of Letters Patent No. 313,943, dated March 17, 1885.

Application filed February 2, 1885. (No model.)

*To all whom it may concern:*

Be it known that I, MARTIN J. KUGLER, a citizen of the United States, residing at Barnesville, in the county of Belmont and State of Ohio, have invented a new and useful Improvement in Bench-Dogs, of which the following is a specification, reference being had to the accompanying drawings.

My invention relates to bench-dogs; and it has for its object to provide a device of this character, to be used in connection with the ordinary stop, which may be moved to different lengths of material to be operated upon, and one which the backward pressure exerted by the material will serve to tighten and hold in place against movement.

A further object of the invention is to provide a bench-dog which shall be simple in its construction, effective in its operation, strong and durable, and not likely to get out of order; and, further, to provide a bench-dog which may be manufactured and supplied at a slight cost.

With these ends in view the invention consists in the combination, with a fixed guide, of a movable dog.

The invention further consists in the combination, with a fixed guide, of a movable dog having an inwardly-bent end.

The invention further consists in the improved construction and combinations of parts, hereinafter fully described, and pointed out in the claims.

Figure 1:
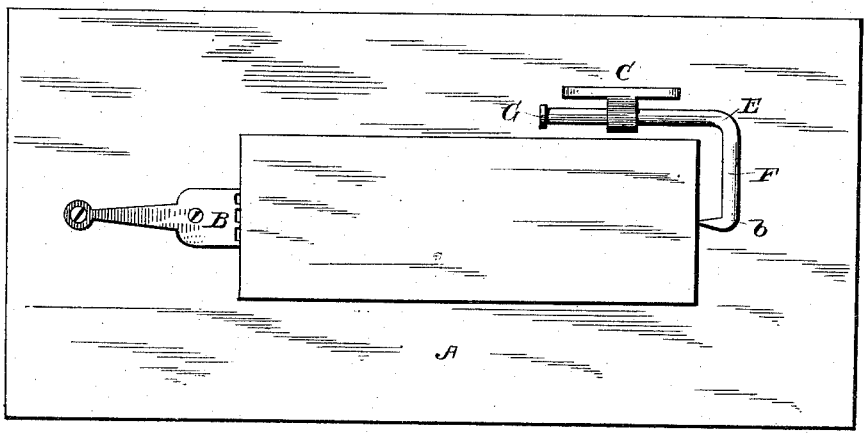
Figure 2:
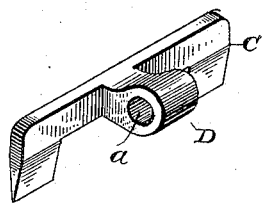
Figure 3:
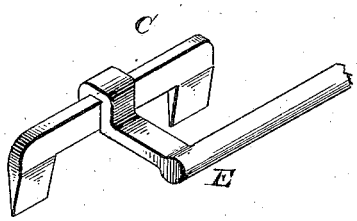

In the drawings, Figure 1 is a plan view of a work-bench, showing my improved dog applied thereto, and shown in position for operation. Fig. 2 is a detail view of the guide, and Fig. 3 is a modification.

In the accompanying drawings, in which like letters of reference indicate corresponding parts in all the figures, A represents the top of a work-bench, and B the ordinary serrated or toothed stop usually employed.

C represents a bar having its ends turned downwardly and formed wedge shape, in order that they may be easily driven into the top of the bench. This bar C has formed integral with it an inwardly-extending boss, D, which is provided with a longitudinal passage or opening, *a*.

E represents the dog, which has the inwardly-turned end F, having its end turned, as at *b*, to form a barb adapted to bear against the material being operated upon. The other end of the dog E is formed with a head, G, which prevents its being detached from the boss in which it is adapted to slide.

In the modification shown in Fig. 3 the boss is formed on the dog, and is adapted to receive and slide upon the bar or guide C.

The operation is as follows: The material to be operated upon is placed upon the top of the work-bench with its end bearing against the stop B. The dog is then slid upon the guide and its end pressed into engagement with the material, and the backward force or pressure serves to throw the end of the dog out of a straight line, and thus wedges it in place. To disengage the dog it is only necessary to tap the head of the dog, when it may be removed from the material. When the dog is not in use, it may be thrown into the position shown by dotted lines in Fig. 1.

The above-described dog is simple in its construction and not likely to get out of order. The side or back pressure of the material tends to tighten the dog and hold it in place. It is easily and quickly adjusted, and saves both time and trouble, and fastens itself automatically.

Having fully described my invention, what I claim as new, and desire to secure by Letters Patent, is—

1. In a bench-dog, the combination, with a guide having downturned ends, of a dog having an inturned end formed with a point or barb, said dog sliding on the guide, substantially as set forth.

2. The combination, with a guide comprising a bar having downturned ends and a boss having a passage or opening, of a dog located and adapted to slide in said passage, said dog having an inturned end formed with a point or barb and a headed end, substantially as set forth.

In testimony that I claim the foregoing as my own I have hereto affixed my signature in presence of two witnesses.

MARTIN J. KUGLER.

Witnesses:
JOHN B. BULGER,
CHARLES KUGLER.